United States Patent Office 3,090,803
Patented May 21, 1963

3,090,803
GLUTARALDEHYDE DICYANOHYDRIN AND ACYL DERIVATIVES THEREOF
Harry A. Stansbury, Jr., South Charleston, and Howard R. Guest, Charleston, W. Va., assignors to Union Carbide Corporation, a corporation of New York
No Drawing. Filed July 29, 1957, Ser. No. 674,628
3 Claims. (Cl. 260—465.4)

This invention relates to new chemical compounds and to a process for their preparation. More particularly, this invention relates to 2,6-dihydroxypimelonitrile, its functional derivatives and methods for their preparation.

The compounds to which the present invention relates have the following general formula:

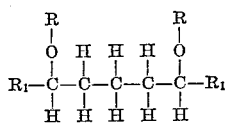

wherein R is a member selected from the group consisting of hydrogen or an acyl radical containing 2-10 carbon atoms and $R_1$ is a member selected from the group consisting of the nitrile, carboxyl and carbalkoxy radicals wherein the alkoxy portion of the carbalkoxy radical may contain from 1 to 20 carbon atoms. Examples of the novel class of compounds of the present invention are: 2,6-dihydroxypimelic acid; 2,6-diacetoxypimelic acid; 2,6-dibutanoyloxypimelic acid; 2,6-di-(2-ethylhexanoyloxy) - pimelic acid; 2,6 - dihydroxypimelonitrile; 2,6 - diacetoxypimelonitrile; 2,6 - dipropionyloxypimelonitrile; 2,6 - dibutanoyloxypimelonitrile; 2,6-di - (2 - ethylhexanoyloxy) - pimelonitrile; diethyl 2,6-dihydroxypimelate; dipropyl 2,6-acetoxypimelate; di-(2-ethylhexyl) 2,6-dihydroxypimelate; di-(dodecyl) 2,6-dibutanoyloxypimelate; and di-(2-ethylhexyl) 2,6-diacetoxypimelate.

We have discovered that aqueous solutions of glutaraldehyde will condense with hydrogen cyanide in the presence of a basic catalyst to form 2,6-dihydroxypimelonitrile (glutaraldehyde dicyanohydrin). This reaction requires a pH of 5.5 or above, otherwise no appreciable reaction will occur. If the reaction medium is too alkaline, however, with a pH above about 11.0, the glutaraldehyde will condense with itself to form polymeric material. Among the suitable catalysts are either the hydroxides, carbonates or cyanides of the alkali metals such as sodium, potassium or calcium. Organic base-reacting compounds may also be used as catalysts such as pyridine, triethylamine, and tributylamine. The catalyst may be present from about 0.01% to about 2.0% by weight of the reaction mixtures. The dicyanohydrin may be produced at a temperature from about minus 10° C. to about 60° C., with 20 to 40° C. being the preferred range. The reaction may be accomplished under a pressure of from about 5 p.s.i. absolute to about 150 p.s.i. absolute, and preferably at atmospheric pressure, for a period of from about 5 minutes to about 5 hours.

Our novel dicyanohydrin is a useful intermediate for the synthesis of various compounds. For example, it can be hydrolyzed with mineral acids to form the corresponding organic acid and reacted with mineral acids in the presence of alcohols to form the corresponding esters. The acid may be reacted with alcohols to form esters or with organic acid anhydrides in a substitution reaction to form acyloxy derivatives. The dicyanohydrin may also be reacted with acid anhydrides, to form 2,6-diacyloxypimelonitriles. The esters, acylated dinitriles, and their derivatives are also useful as plasticizers for synthetic organic resins such as the vinyl resins and various cellulose resins. A few of the vinyl resins which are plasticized by our novel componds are: polyvinyl chloride, polyvinyl acetate, vinyl chloride-vinyl acetate copolymers and vinyl chloride-acrylonitrile copolymers. Various cellulose resins which are plasticized by our compounds are cellulose acetate, cellulose acetate-butyrate, and nitrocellulose. Of particular value as plasticizers are the combinations of: the diesters of 2,6-dihydroxypimelate with cellulose acetate; the diesters of 2,6-diacyloxypimelate with vinyl chloride-vinyl acetate copolymers; and the 2,6-diacylpimelonitrile with vinyl chloride-acrylonitrile copolymers.

Acylation of the 2,6-dihydroxypimelonitrile with an organic acid anhydride having 4-20 carbon atoms forms the various 2,6-diacyloxypimelonitriles disclosed in this application such as the 2,6-diacetoxypimelonitrile. The temperature range for this acylation reaction is from about 50° C. to about 200° C., with the preferred range being 100-150° C. For each mole of the dicyanohydrin, 2 to 10 moles of anhydride may be employed.

The 2,6-dihydroxypimelonitrile may be hydrolyzed with mineral acids such as hydrochloric acid, sulfuric acid, phosphoric acid, hydrobromic acid and nitric acid to form 2,6-dhydroxypimelic acid. Hydrochloric is the preferred acid because of its availability at low cost and the production of a minimum of by-products during the hydrolysis. About 2.0 to 10.0 molar equivalents of acid may be employed per mole of dicyanohydrin. The hydrolysis temperatures may be in the range of 30 to 150° C., with 70-110° C. being preferred.

The acid hydrolysis of the 2,6-dihydroxypimelonitrile may be carried out in the presence of an alcohol (having 1-20 carbon atoms) such as ethanol, propanol, 2-ethylhexanol, dodecanol and cetyl alcohol to form a dialkyl 2,6-dihydroxypimelate. In certain cases it may be desirable to complete the hydrolysis in the absence of alcohol and then remove the water and mineral acid by distillation. The resulting 2,6-dihydroxypimelic acid (taken as a residue product) may then be esterified by the addition of alcohol and an acid catalyst and the removal of water of esterification by conventional procedures. The moles of alcohol employed per mole of dicyanohydrin may be varied from 2-20 with 8-12 being the preferred range.

The dialkyl 2,6-dihydroxypimelates may be acylated with organic acid anhydrides in the same manner as in the acylation of the dinitrile.

The following examples are illustrative of the invention.

EXAMPLE I

A mixture of 413 grams of 24.2% aqueous glutaraldehyde (1 mole) and 37 ml. of 2% sodium hydroxide (to increase the pH to 8) was stirred at 20° C. while 60 grams of hydrogen cyanide (2.2 moles) were fed over a period of 20 minutes. Additional sodium hydroxide (10 ml. of 2% NaOH) was fed intermittently to maintain the pH at 8. After a reaction period of 30 minutes at 20° C., the solution was acidified with 4 ml. of 85% phosphoric acid and stripped to a kettle temperature of 70° C. at 8 mm. of mercury pressure to obtain 2,6-dihydroxypimelonitrile as a viscous product having these properties: $n_D^{30}=1.4760$, sp. g. $24°/20/=1.194$, miscible in water. The residue (161 grams) was fed over a period of 50 minutes to 816 gms. of acetic anhydride (8 moles) while stirring at 125°–134° C. After a reaction period of 30 minutes at 125°–130° C., the solution was fractionated to isolate 2,6-diacetoxypimelonitrile having the properties reported in Table I. This new compound was found to be a good plasticizer for acrylonitrile resins. The over-all yield and efficiency of this new ester-nitrile was 60% based on the glutaraldehyde.

|  | Molecular Weight | Percent C | Percent H | Percent N | Boiling range at 5 mm. of mercury pressure (° C.) | Sp. G. 21°/20° | $N_D^{30}$ |
|---|---|---|---|---|---|---|---|
| Observed | [1] 214 | 55.2 | 6.2 | 11.5 | 200–204 | 1.134 | 1.4434 |
| Theoretical | 238 | 55.4 | 5.9 | 11.8 |  |  |  |

[1] By the Menzies-Wright method.

EXAMPLE II

Glutaraldehyde and hydrogen cyanide were condensed as described above and the aqueous solution was acidified with 2 ml. of 37% hydrochloric acid. Dry hydrogen cyanide (161 gms., 4.5 moles) was fed while stirring at 25–55° C. The mixture was stirred at 70° C. for 30 minutes and at 100° C. for 35 minutes to complete the hydrolysis. The cooled mixture was filtered to remove ammonium chloride and the filtrate was stripped to a kettle temperature of 48° C./100 mm. to remove water. The residue was digested in hot acetone (200 ml.) and filtered to remove all the remaining ammonium chloride. Analysis of the acetone solution (304 gms.) showed that it contained 54.7% as 2,6-dihydroxypimelic acid, which corresponded to an over-all yield of 87% based on glutaraldehyde. Upon attempted distillation, the 2,6-dihydroxypimelic acid was converted to a high melting, cross-linked polymer of the polyester type. The dihydroxy acid could not be induced to crystallize from several common solvents, which indicated the acid is a liquid. The 2,6-dihydroxypimelic acid in aqueous solution was treated with a slight molar excess of cupric acetate. After standing 4 days, the pale green crystals of cupric 2,6-dihydroxypimelate were filtered and washed with hot water and then with acetone. The salt, which melted at 214° C. with decomposition, was the dihydrate as shown by Table II. After drying at 140° C. under a reduced pressure of 150 mm. of mercury for 4 hours, the salt was anhydrous as shown by the following analysis: 23.2% Cu (theory 25.1%), 32.3% C (theory 33.1%), 4.2% H (theory 3.9%). The yield of pure cupric 2,6-dihydroxypimelate was 41% based on the dihydroxy acid.

Table II.—Cupric-2,6-Dihydroxypimelate

|  | Melting Point (° C.) | Percent Cu | Percent C | Percent H |
|---|---|---|---|---|
| Observed | 214 | 21.7 | 30.7 | 4.5 |
| Theoretical |  | 21.9 | 29.0 | 4.8 |

EXAMPLE III

A solution of 413 gms. of 24.2% aqueous glutaraldehyde (1 mole) in 25 ml. of 2% sodium hydroxide (to increase the pH to 8) was stirred at 20° C. while 60 gms. of hydrogen cyanide (2.2 moles) were fed over a period of 20 minutes. During the feed period 4 ml. more of 2% sodium hydroxide were added to maintain the pH at 8. After a reaction period of 20 minutes at 20° C., the solution was acidified with 1.5 of 37% hydrochloric acid. After 1300 gms. of 2-ethylhexanol (10 moles) were added, 160 gms. of dry hydrogen chloride (4.4 moles) were fed and the mixture was refluxed 2 hours at 100° C. to complete the esterification. The cooled mixture was washed 3 times with 500 cc. portions of water. After the washed oil was stripped free of 2-ethylhexanol, the residue was distilled in a molecular still to obtain di-(2-ethylhexyl) 2,6-dihydroxypimelate having the properties shown in Table III. This compound was found to have utility as a plasticizer for cellulose acetate resins. The yield and efficiency were 48% based on glutaraldehyde.

Table III.—Di-(2-Ethylhexyl) 2,6-Dihydroxypimelate

|  | Mol. Wt. | Percent C | Percent H | Molecular Distillation at 6 microns, ° C.[2] | Sp.G. 20°/20° | $N_D^{30}$ | Percent purity by ester analysis |
|---|---|---|---|---|---|---|---|
| Observed | [1] 387 | 65.1 | 10.3 | 133 | 1.092 | 1.4568 | 98.2 |
| Theoretical | 416 | 66.3 | 10.6 |  |  |  |  |

[1] Determined by the Menzies-Wright method.
[2] Temperature of the heated rotor of the still. The term, boiling point, cannot be used in describing a molecular distillation.

EXAMPLE IV

A solution of 98 gms. of di-(2-ethylhexyl) 2,6-dihydroxypimelate (0.236 mole) and 96 gms. of acetic anhydride (0.944 mole, 100% excess) was heated at 130° C. for 15 minutes. The mixture was stripped under reduced pressure to a kettle temperature of 130° C./4 mm. to obtain di(2-ethylhexyl) 2,6-diacetoxypimelate as a colorless residue product having these properties: $n_D^{30}$=1.4495, sp. g. 20/20°=1.012, 97.6% purity by analytical saponification. This compound was found to have utility as a plasticizer for the vinyl chloride-vinyl acetate copolymers. The yield was 95% based on the dihydroxyester starting material.

EXAMPLE V

This example shows the use of 2,6-diacetoxypimelonitrile as a plasticizer for resins. The plasticizer was admixed with the resin by conventional means.

| | |
|---|---|
| Plasticizer | 2,6-diacetoxypimelonitrile |
| Percent of plasticizer in resin [1] | 40 |
| Tensile strength, p.s.i. | 2,800 |
| Elongation (percent) | 295 |
| Load at 100% elongation, pounds per square inch | 1,400 |
| ASTM stiffness modulus, pounds per square inch [2] | 600 |
| Flex-temperature, $T_F$ ° C.[3] | −6 |
| $T_4$ ° C.[4] | 13 |
| Brittle temperature, ° C.[5] | −4 |
| Percent extraction: | |
| Oil | 5.0 |
| Water | 11.9 |
| Durometer "A" hardness [6] | 63 |
| SPI volatility, percent in 24 hours at 70° C. (A.S.T.M. Procedure D–1203–55) | 15.2 |

[1] Vinyl chloride-acrylonitrile copolymer containing 59.9% vinyl chloride, 40.1% acrylonitrile and having a reduced viscosity of 1.265.
[2] A.S.T.M. Procedure D–747–50.
[3] Flex temperature is defined as the temperature which yields an apparent modulus of elasticity of 135,000 pounds per square inch, according to the work of Clash and Berg, Ind. Eng. Chem. 34, 1218 (1942). A.S.T.M. Procedure D–1043–51.)
[4] $T_4$ is defined as the temperature which yields an apparent modulus of elasticity of 10,000 pounds per square inch, according to the work of Clash and Berg, Ind. Eng. Chem., 34, 1218 (1942). (A.S.T.M. Procedure D–1043–51.)
[5] Brittle temperature was measured by A.S.T.M. Procedure D–746–55T.
[6] Durometer "A" hardness was measured according to A.S.T.M. Procedure D–676–42T.

What is claimed is:
1. Glutaraldehyde dicyanhydrin.
2. Chemical compounds having the formula:

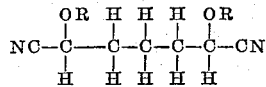

wherein R is an alkyl carboxylic acid acyl radical containing from 2–10 carbon atoms.
3. A chemical compound having the formula:
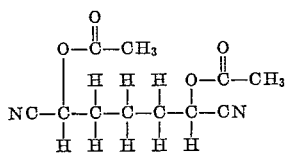
References Cited in the file of this patent
UNITED STATES PATENTS
2,731,489   Stansbury et al. _____ Jan. 17, 1956
OTHER REFERENCES
Beilstein's Handbuch der Organischen Chemie, volume 3, page 536, 1918; volume 3, first supp., page 185, 1929; volume 3, second supp., page 343, 1942.